(12) United States Patent
Combes et al.

(10) Patent No.: US 12,434,300 B2
(45) Date of Patent: Oct. 7, 2025

(54) METHOD FOR SEPARATING A PART BLANK FROM A SUPPORT BY FLUID EXPANSION IN THE ADDITIVELY MANUFACTURED SUPPORT

(71) Applicant: SAFRAN AIRCRAFT ENGINES, Paris (FR)

(72) Inventors: Guilhem Kevin Combes, Moissy-Cramayel (FR); Sébastien Vincent François Dreano, Moissy-Cramayel (FR); Pierre Jean-Baptiste Metge, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 200 days.

(21) Appl. No.: 17/755,466

(22) PCT Filed: Oct. 20, 2020

(86) PCT No.: PCT/FR2020/051886
§ 371 (c)(1),
(2) Date: Apr. 29, 2022

(87) PCT Pub. No.: WO2021/084186
PCT Pub. Date: May 6, 2021

(65) Prior Publication Data
US 2024/0165708 A1    May 23, 2024

(30) Foreign Application Priority Data

Oct. 30, 2019  (FR) ...................... 1912226

(51) Int. Cl.
*B22F 10/40*    (2021.01)
*B22F 3/24*     (2006.01)
(Continued)

(52) U.S. Cl.
CPC .............. *B22F 10/40* (2021.01); *B22F 5/009* (2013.01); *B22F 10/64* (2021.01);
(Continued)

(58) Field of Classification Search
CPC ................................. B22F 10/40; B22F 10/47
See application file for complete search history.

(56) References Cited

U.S. PATENT DOCUMENTS

2017/0066197 A1    3/2017  Morikawa et al.
2018/0169757 A1*   6/2018  Murao ................... B29C 64/40
(Continued)

FOREIGN PATENT DOCUMENTS

| EP | 3170589 A1 | 5/2017 |
| EP | 3511093 A1 | 7/2019 |
| FR | 3064519 A1 | 10/2018 |

OTHER PUBLICATIONS

FR3064519A1 English language translation (Year: 2018).*
(Continued)

*Primary Examiner* — Sally A Merkling
*Assistant Examiner* — Sean P. O'Keefe
(74) *Attorney, Agent, or Firm* — McDonald Hopkins LLC

(57) ABSTRACT

A method for separating a part blank from a support, wherein the support and the part blank are manufactured by additive manufacturing. The support includes an inner cavity containing a fluid. The separation method includes a heating of the support to deform the support by fluid expansion in the inner cavity until the support is separated from the part blank.

15 Claims, 3 Drawing Sheets

(51) Int. Cl.
*B22F 5/00* (2006.01)
*B22F 10/64* (2021.01)
*B33Y 40/20* (2020.01)

(52) U.S. Cl.
CPC ... *B22F 2003/247* (2013.01); *B22F 2003/248* (2013.01); *B33Y 40/20* (2020.01)

(56) References Cited

U.S. PATENT DOCUMENTS

2018/0311733 A1* 11/2018 Zafar ................... B29C 64/40
2022/0111442 A1* 4/2022 Zrodowski ............. B33Y 40/00
2022/0274178 A1* 9/2022 Ceriani .................. G06F 30/10

OTHER PUBLICATIONS

Search Report issued in French Patent Application No. 1912226 dated Apr. 23, 2020.
International Search Report for issued in Application No. PCT/FR2020/051886 dated Dec. 10, 2020.
Written Opinion for PCT/FR2020/051886 dated Dec. 10, 2020.

* cited by examiner

METHOD FOR SEPARATING A PART BLANK FROM A SUPPORT BY FLUID EXPANSION IN THE ADDITIVELY MANUFACTURED SUPPORT

This is the National Stage of PCT international application PCT/FR2020/051886, filed on Oct. 20, 2020 entitled "METHOD FOR SEPARATING A PART BLANK FROM A SUPPORT BY FLUID EXPANSION IN THE ADDITIVELY MANUFACTURED SUPPORT", which claims the priority of French Patent Application No. 1912226 filed Oct. 30, 2019, both of which are incorporated herein by reference in their entireties.

TECHNICAL FIELD

The invention relates to the technical field of powder-bed additive manufacturing, also known as 3D printing. It relates more specifically to a method for separating a part blank from a support, the part blank and the support being manufactured by layer-by-layer powder deposition, partially solidified by selecting melting or selective sintering using a laser beam or an electron beam.

BACKGROUND OF THE INVENTION

Powder-bed selective melting or selective sintering methods make it possible to easily produce metal or ceramic parts such as turbine engine parts which are subjected to substantial mechanical and/or thermal stress.

Such methods are particularly known under the acronyms SLM ("Selective Laser Melting"), SLS ("Selective Laser Sintering"), DMLS ("Direct Metal Laser Sintering") and EBM ("Electron Beam Melting").

These methods generally comprise a step of depositing, using a roller or scraper type spreading means, a first powder layer in a manufacturing vessel, the bottom of which is formed by a plate that is movable in translation, followed by a step of heating with a laser beam or with an electron beam a predefined zone of the powder layer. The energy supplied by this beam induces the local melting or local sintering of the powder which, on solidifying, forms a first layer of the part.

The plate is then lowered by a distance corresponding to the thickness of a layer, then a second powder layer is conveyed by the spreading means onto the previous layer. Thereafter, a second layer of the part is formed using the beam. These steps are repeated until the part blank and the part support fully manufactured.

Finally, the part blank is separated from the support and the manufacturing plate by electromachining cutting steps which are long, costly and difficult to implement.

DESCRIPTION OF THE INVENTION

The aim of the invention is that of resolving, at least partially, the problems encountered in prior art solutions.

In this regard, the invention relates to a method for separating a part blank from a support for the part blank. The support and the part blank are manufactured by additive manufacturing. The support comprises an inner cavity containing a fluid.

According to the invention, the separation method comprises a heating of the support to deform the support by fluid expansion in the inner cavity until the support is separated from the part blank.

Thanks to the deformation of the support by fluid expansion in the inner cavity, the part blank is separated easily, more quickly and at a lower cost from the support than by electroerosive cutting. The productivity of the manufacturing method of the part is enhanced. The implementation of the manufacturing method is facilitated and the manufacturing costs of the part are reduced.

It is particularly possible to do away at least partially with a spark-machining step to separate the part blank from the support, making it shorter and less difficult or replacing it by another subsequent cutting method.

The invention goes against the general principle which is that of avoiding producing closed inner cavities during the additive manufacturing of a part. The aim of this general principle is particularly that of better providing and controlling the shape, structure and mechanical strength of the part. It particularly makes it possible to reduce the risk of an undesirable presence of non-melted or non-sintered powdery material in the cavity.

The invention is not limited by this constraint, by producing the inner cavity in a support which is distinct from the part to be manufactured and which acts as a deformable support for manufacturing the part.

The invention can optionally include one or more of the following features combined with one another or not.

According to an embodiment specificity, the cavity is hermetically sealed to the fluid. Preferably, the fluid is a gas. The gas can particularly be the air contained in the inner cavity during the manufacture of the support.

According to a further embodiment specificity, the support is symmetrical by planar symmetry with respect to a longitudinal axis of the support.

According to an embodiment specificity, the support is deformed by retracting axially along a longitudinal direction of the support and by extending transversely along a perpendicular direction to the longitudinal direction of the support.

According to an embodiment specificity, the support comprises an outer wall which delimits the inner cavity and which has a thickness between 0.3 mm and 1 mm, preferably 0.6 mm.

The outer wall has a sufficient thickness to be manufactured by additive manufacturing, while having a sufficiently small thickness to enable a deformation of the support by expansion of the fluid in the inner cavity. The outer wall is particularly tight to the fluid in the inner cavity.

According to an embodiment specificity, the inner cavity is configured to stretch between 60% and 100% along a maximum deformation direction of the inner cavity, preferably 80%.

The volume of the inner cavity is large enough to enable the expansion of a large quantity of fluid and the deformation of the support.

According to an embodiment specificity, a linking portion is located between the support and the part blank. The linking portion has a lower mechanical strength than the mechanical strength of the part blank and the mechanical strength of the support.

The linking portion is broken, particularly torn, during the heating of the assembly formed by the part blank and the support, this heating inducing the deformation of the support.

The linking portion facilitates the separation of the part blank from the support by limiting the mechanical stress exerted on the part blank when separating the part blank from the support.

According to an embodiment specificity, the linking portion has a lower density than the density of the part blank and/or the density of an outer wall of the support.

The part blank, the linking portion and the support are preferably made by additive manufacturing from the same material. The material of the part blank, the linking portion and the support is particularly a metallic material.

The invention also relates to a method for manufacturing a turbine engine part, implementing a separation method as defined above. The method comprises additive manufacturing of the part blank and the support, particularly with a powder-bed selective melting or selective sintering method.

According to an embodiment specificity, the heating of the support takes place during a stress-relieving heat treatment of the part blank to limit the thermal and/or mechanical stress of the part blank.

Preferably, the measuring method comprises separation of the linking portion from the part blank after separating the part blank from the support, particularly by machining.

According to an embodiment specificity, the manufacturing method comprises a step of separating the part blank from a base to which the part blank and the support are secured, after separating the part blank from the support.

BRIEF DESCRIPTION OF THE DRAWINGS

The present invention will be understood more clearly on reading the description of embodiment examples given merely by way of indication and in no way limitation with reference to the appended drawings wherein.

DETAILED DESCRIPTION OF SPECIFIC EMBODIMENTS

Identical, similar or equivalent parts of the different figures bear the same reference numbers so as to facilitate the transition from one figure to another.

Figure 1:
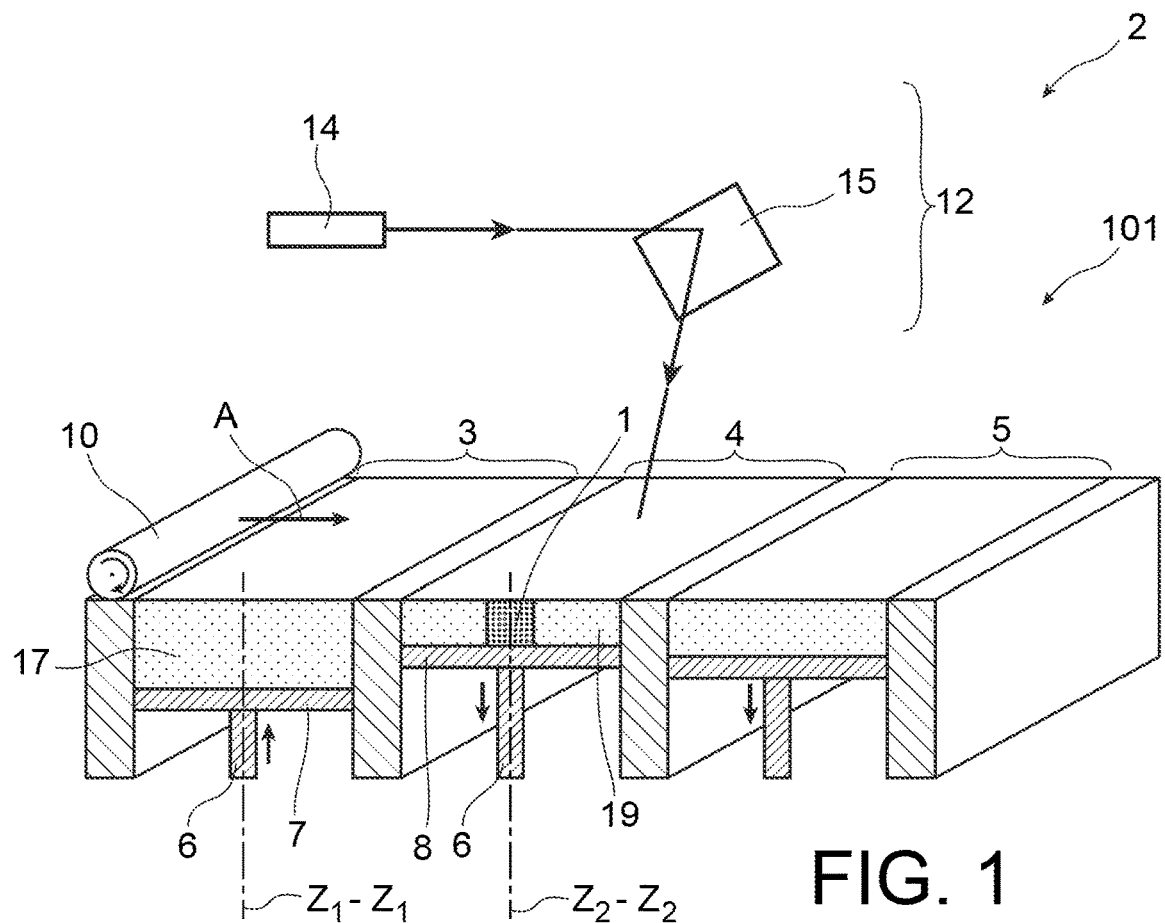
FIG. 1 is a partial schematic representation of an additive manufacturing tool which is used for implementing an additive manufacturing method according to a first embodiment of the invention.

FIG. 1 represents an example of a tool 2 for manufacturing a part 1 by powder-bed selective melting or selective sintering according to a manufacturing method according to a first embodiment.

The part 1 is an aircraft turbine engine part, for example a blade, a wall or a flange. It is configured to withstand particularly substantial mechanical and/or thermal stress during turbine engine operation. It is manufactured by additive manufacturing from a powdery material 17 which is typically a metallic material powder for aeronautical use.

The part 1 comprises a lower end 1a, an upper end 1b which is opposite the lower end 1a and a body 11 between the lower end 1a and the upper end 1b. The upper end 1b is particularly overhanging in relation to the upper face S2 of the manufacturing plate 8 of the tool 2, which makes it difficult to manufacture without a support 20.

The tool 2 also includes a feed vessel 3 of powdery material 17, a manufacturing vessel 4, wherein the part blank 1 will be formed, and a third vessel, which can be a recovery vessel 5 of the excess powdery material or a second feed vessel.

The bottom of each vessel is formed of a plate which is movable in translation along an actuation arm 6 oriented along a vertical axis of the vessels. Each plate comprises a metal panel which forms a base for the powdery material 17. The plate 7 of the feed vessel is configured to move along a first vertical axis Z1-Z1 which is substantially parallel with the second vertical axis Z2-Z2 of the manufacturing plate 8.

Actuating the plate 7 of the feed vessel makes it possible to convey powdery material into the manufacturing vessel 4. The manufacturing plate 8 of the manufacturing vessel, on lowering, enables the creation of the successive layers 19 of the part blank 1.

The tool 2 also includes a spreading means 10, of the roller type such as that shown in FIG. 1 or the scraper type, which makes it possible to push the powdery material 17 from the feed vessel 3 into the manufacturing vessel 4 and spread this powdery material, in the feed vessel 3, so as to form a layer 19 of powder of defined thickness. To do this, the spreading means 10 moves along a horizontal sweeping plane along a movement direction represented by the arrow A ranging from the feed vessel 3 to the recovery vessel 5. The excess powder can be recovered in the recovery vessel 5.

The tool 2 further comprises a heating means 12 configured to melt or sinter at least a portion of a layer 19 of powder deposited on the manufacturing plate 8, so as to obtain, after solidification, a layer 19 of the part blank 1.

The heating means 12 comprises for example a laser 14 and one or more mirrors 15 for sending the laser beam to zones of the powdery material layer 17 to be melted or sintered. The manufacturing vessel 4 will thus contain, after the scanning of the powdery material layer by an energy beam, the layer 19 of solidified material which is surrounded by the non-melted or non-sintered powdery material.

With reference to FIGS. 1 to 4, the manufacturing plate 8 comprises a lower outer surface S1 and an upper outer surface S2 which is opposite the lower outer surface S1 and to which are attached the part blank 1 and a support 20 for the part blank 1, following an additive manufacturing step 101 of the part blank 1, the support 20 and a linking portion 9 which mechanically connects the part blank 1 to the support 20.

The support 20 is made of the same material as the part blank 1. The support 20 comprises an outer wall 22 which delimits it externally and which delimits an inner cavity 21 inside the support 20, a lower end 20a and an upper end 20b which is longitudinally opposite the lower end 20a.

Figure 3:
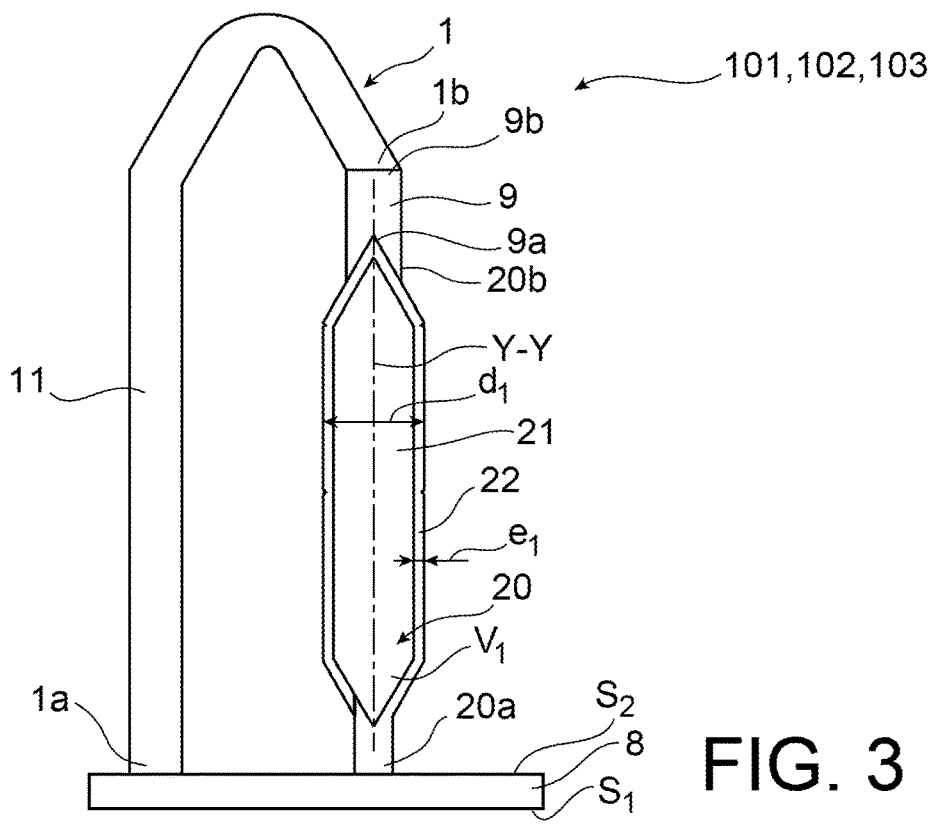
FIG. 3 is a partial schematic longitudinal sectional representation of the support, a linking portion, the part blank and the tool after melting or sintering the powdery material and before separating the part blank from the support.

The support 20 extends longitudinally along a longitudinal axis Y-Y which is substantially parallel with the longitudinal axis Z3-Z3 of the part blank 1, following the additive manufacturing step 101 of the part blank 1 and the support 20. The support 20 is substantially symmetrical by planar symmetry with respect to the longitudinal axis Y-Y of the support. With reference particularly to FIG. 3, the outer wall 22 has a general rhombus shape in longitudinal section passing through the longitudinal axis Y-Y of the support 20. The symmetrical shape of the support 20 enables more homogeneous deformation of the support 20 about the longitudinal axis Y-Y. A dissymmetrical shape would also work, in particular if the sought effect would be to induce the deformation of the support in a specific direction, for example a tilt, instead of a simple expansion-retraction type deformation.

In the present document and unless specified otherwise, an axial or longitudinal direction is a parallel direction with the longitudinal axis Y-Y of the support 20. A radial or transverse direction is an orthogonal direction to the longitudinal axis Y-Y of the support and secant with this axis. A circumferential direction is defined as a locally orthogonal direction to a radial direction and to the direction of the longitudinal axis Y-Y of the support.

Figure 4:
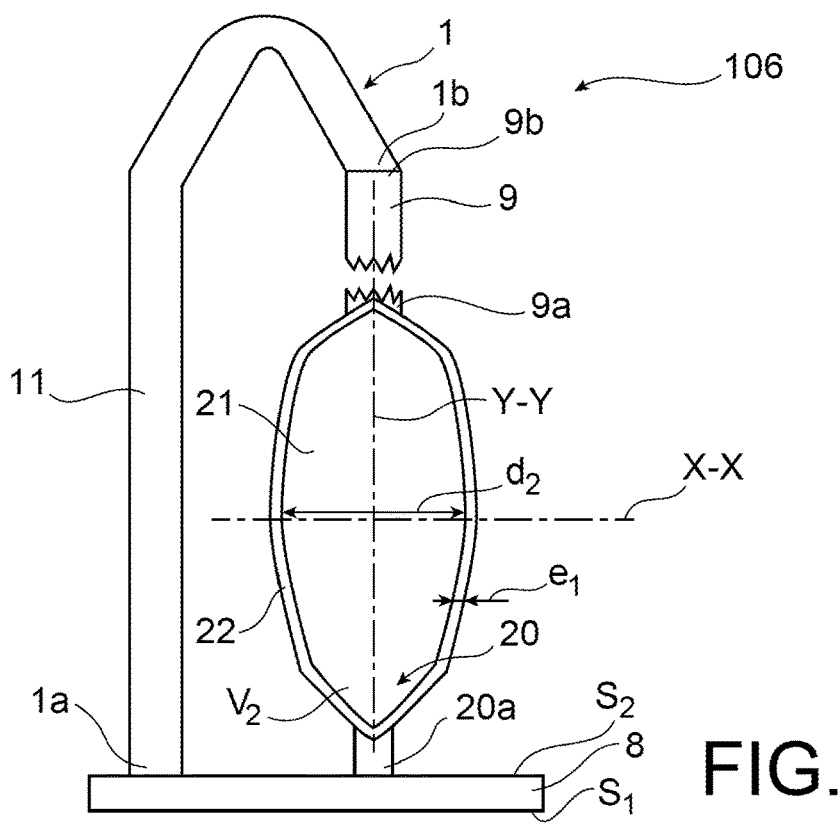
FIG. 4 is a partial schematic longitudinal sectional representation of the support, a linking portion, the part blank and the tool after separating the part blank from the support.
Figure 5:
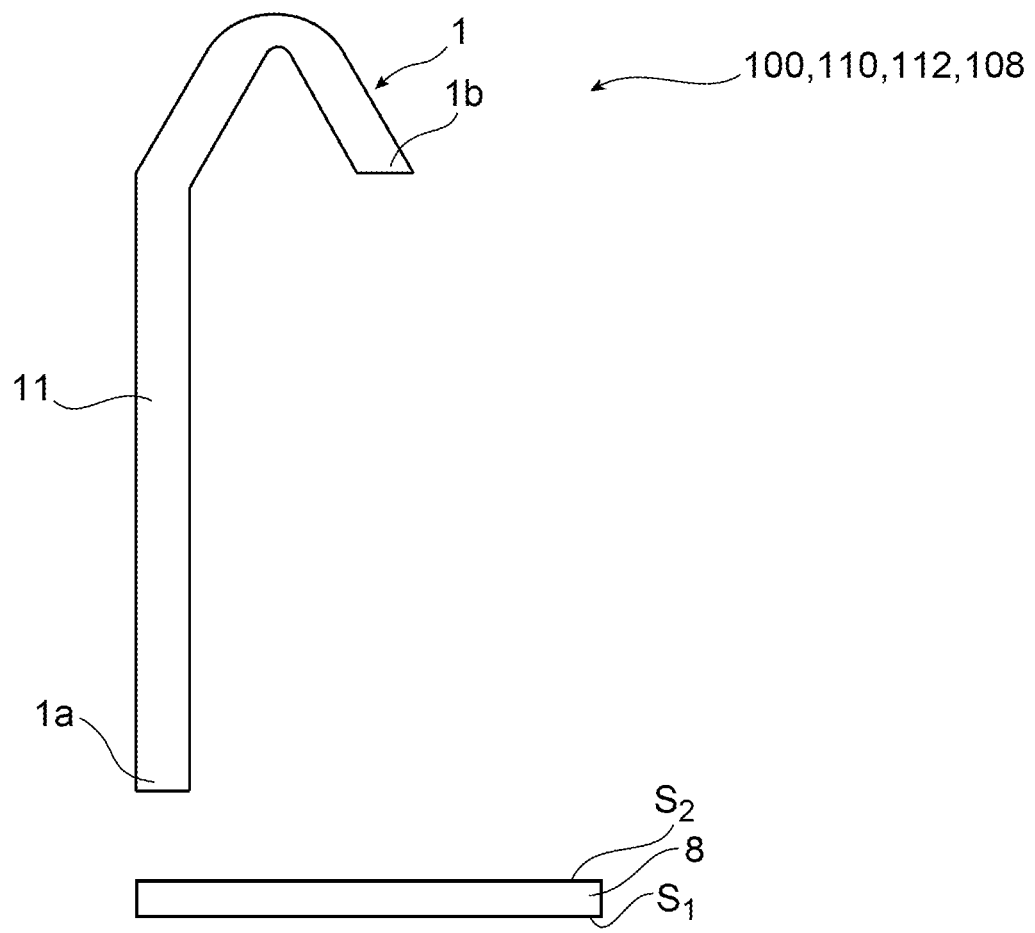
FIG. 5 illustrates the part after separating the part blank from the tool and after machining the part blank.

With joint reference to FIGS. 3 and 4, the support 20 is configured to be deformed axially along a direction of the longitudinal axis Y-Y of the support and transversely along at least one direction perpendicular to the direction of the longitudinal axis Y-Y of the support. In the embodiment shown, the support 20 is configured to be deformed by retracting axially and extending transversely.

The inner cavity 21 of the support contains a fluid. This fluid is a gas, typically air which has been trapped in the inner cavity 21 during the melting or sintering of the powdery material 17 to form the support 20. The inner cavity 21 is hermetically sealed to the fluid, which enables the fluid to expand in the inner cavity 21 and induce the deformation of the support 20 when it is heated.

During a heating 102, 103 of the support 20, the inner cavity 21 is particularly configured to induce an elongation from a diameter d1 to a diameter d2 capable of ranging from 60% to 100% along a radial direction X-X of maximum deformation of the inner cavity 21, for example 80%. The volume of the inner cavity 21 increases between 40% and 60% from an initial volume V1 which is represented in FIG. 3 to a volume V2 which is represented in FIG. 4.

The outer wall 22 is tight to the fluid to keep it trapped in the inner cavity 21. The outer wall 22 has a thickness e1 between 0.3 mm and 1 mm, for example of 0.6 mm. The thickness e1 of the outer wall 22 remains substantially constant before and after the heating 102, 103 of the support 20.

The linking portion 9 extends longitudinally along the direction of the longitudinal axis Y-Y of the support. In the embodiment shown, the linking portion 9 is made of the same material as the part blank 1 and the support 20. The linking portion 9 is an alveolar support. It comprises partitions delimiting hollows and forming a grid matrix. It has a lower density than that of the part blank 1 and a lower density than the density of the outer wall 22 of the support, due to the hollows.

More generally, the linking portion 9 is manufactured by additive manufacturing by means of the tool 2 during the manufacture of the support 20 and the part blank 1. The linking portion 9 is configured to have a lower mechanical strength than the mechanical strength of the part blank 1 and the outer wall 22 of the support. It is configured to be broken, particularly at least partially torn, when separating the part blank 1 from the support 20. The linking portion 9 thus acts as sacrificial material during the manufacture of the part 1. The linking portion 9 facilitates the separation of the part blank 1 from the support 20 by limiting the mechanical stress exerted on the part blank 1 when separating the part blank 1 from the support 20.

The manufacturing method 100 of the turbine engine part 1 is described in more detail hereinafter. The manufacturing method 100 comprises the additive manufacturing step 101 of the support, the linking portion 9 and the part blank 1 on the manufacturing plate 8 by melting or sintering powdery material 17 by means of the tool 2.

Figure 2:
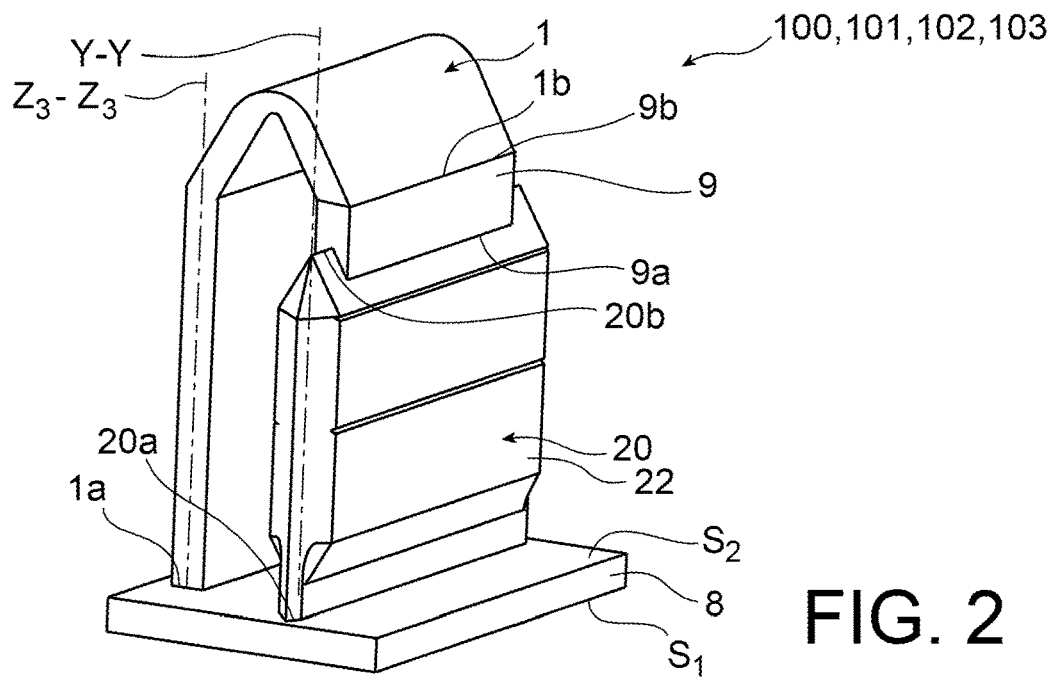
FIG. 2 is a partial schematic perspective representation after melting or sintering the powdery material and before separating the part blank from the support.

With reference to FIGS. 2 and 3, following the additive manufacturing step 101, the support 20 is attached to the manufacturing plate 8 by the lower end 20a thereof which is in mechanical contact with the upper outer surface S2 of the manufacturing plate 8. The support 20 is attached by the upper end 20b thereof to the lower end 9a of the linking portion 9. The linking portion 9 is attached by the upper end 9b thereof to the upper end 1b of the part blank 1. The part blank 1 is attached at the lower end 1a thereof to the manufacturing plate 8.

The manufacturing method 100 continues with a heating 102, 103 of the support 20, the linking portion 9 and the part blank 1, as well as the manufacturing plate 8 which is rigidly connected to the part and the support. This heating 102, 103 particularly comprises a first stress-relieving heat treatment 102 which is aimed at reducing the thermal stress, residual mechanical stress and structural variations generated in the part blank 1, in the support 20 and in the linking portion 9 during the additive manufacturing step 101. This heating 102, 103 can also comprise a second heat treatment 103 to increase the durability and/or the lifetime of the part blank 1. The heating 102, 103 typically takes place at a temperature greater than 900° C.

During the heating 102, 103 of the support 20, the fluid contained in the inner cavity 21 expands, which leads to the support 20 deforming. The support 20 is deformed by retracting axially along the direction of the longitudinal axis Y-Y and extending transversely, which induces substantially mechanical stress on the linking portion 9 until it breaks by stretching it axially. This results in the separation 106 of the part blank 1 from the support 20.

With reference to FIG. 4, the linking portion 9 consists of a first part comprising the lower end 9a of the linking portion 9 which is attached to the part blank 1, and of a second part comprising the upper end 9b of the linking portion 9 and which is attached to the support 20. The deformation of the support 20 by expanding the inner cavity 21 is particularly irreversible.

Following the separation 106 of the part blank 1 from the support 20, the manufacturing method 100 also comprises a machining 112 of the manufacturing plate 8, particularly to separate the lower end 1a of the part blank 1 and the lower end 20a of the support 20 from the manufacturing plate 8. This machining 112 comprises for example a spark-machining.

Following the separation 112 of the part blank 1 from the manufacturing plate 8, the manufacturing method 100 of the part 1 then comprises a machining 108, 110 of the part blank 1, particularly to separate the upper end 9b of the linking portion 9 and/or the lower end 1a of the part blank 1. This machining 108, 110 comprises for example a spark-machining, a milling, a turning, a water jet cutting or a grinding of the part 1.

Thanks to the deformation of the support 20 by fluid expansion in the inner cavity 21, the part blank 1 is separated easily, more quickly and at a lower cost from the support 20 than by electroerosive cutting. The productivity of the manufacturing method 100 of the part is enhanced. The implementation of the manufacturing method 100 is facilitated and the manufacturing costs of the part are reduced.

It is particularly possible to do away at least partially with a spark-machining step to separate the part blank 1 from the support 20, making it shorter and less difficult or replacing it by another subsequent cutting method, particularly by machining 108, 110 of the part blank and/or by machining 112 of the manufacturing plate 8.

The invention goes against the general principle which is that of avoiding producing closed inner cavities during the additive manufacturing of a part blank. The aim of this general principle is particularly that of better providing and controlling the shape, structure and mechanical strength of the part blank. It particularly makes it possible to reduce the risk of an undesirable presence of non-melted or non-sintered powdery material in the inner cavity 21.

The invention is not limited by this constraint, by producing the inner cavity 21 in a support 20 which is distinct from the part 1 to be manufactured and which acts as a deformable support, particularly irreversibly, for manufacturing the part 1.

Obviously, various modifications can be made by a person skilled in the art to the invention described above without leaving the scope of the invention. In particular, the structure of the tool 2, the structure of the support 20, the structure of the linking portion 9 and that of the part 1 can vary in relation to those of the manufacturing method described above.

The support 20 and/or the linking portion 9 can be made from a different material from that of the part blank 1. The linking portion 9 can be made from a different material from that of the support 20.

When the linking portion 9 is made of a material of lower mechanical strength than the material of the support 20, the linking portion 9 can comprise fewer hollows and a higher density while being broken when separating the part blank 1 from the support 20.

Alternatively, the fluid inside the cavity can have a different component from that of air. It can particularly be an inert gas.

Alternatively, the support 20 can be configured to be deformed by retracting along a radial direction X-X to the longitudinal axis Z3-Z3 of the part blank 1 and by extending along an axial direction which is substantially parallel with the direction of the longitudinal axis Z3-Z3 of the part blank 1. In this case, the support 20 is for example configured to push and/or compress a linking portion 9 until it breaks.

The deformation of the support 20 by gas expansion in the inner cavity 21 can take place during the second heat treatment 103 of the part blank 1, the support 20 and the linking portion 9, entirely or continuing the deformation of the support 20 induced during the first heat treatment 102.

What is claimed is:

1. A method for manufacturing a turbine engine part, using a method for separating a blank of the part from a support for the part blank,
    wherein the support and the part blank are manufactured by metallic material powder-bed additive manufacturing on a manufacturing plate, wherein the support is located between the manufacturing plate and the part blank, wherein the support comprises an inner cavity containing a fluid,
    wherein the method for separating the part blank from the support comprises:
        a heating of the support to deform the support by fluid expansion in the inner cavity until the support is separated from the part blank, and
    wherein the inner cavity is configured to stretch between 60% and 100% along a maximum deformation direction of the inner cavity.
2. The manufacturing method according to claim 1, wherein the inner cavity is hermetically sealed to the fluid.
3. The manufacturing method according to claim 1, wherein the inner cavity is hermetically sealed to the fluid and wherein the fluid is a gas.
4. The manufacturing method according to claim 1, wherein the support is deformed by retracting axially along a longitudinal direction of the support and by extending transversely along a perpendicular direction to the longitudinal direction of the support.
5. The manufacturing method according to claim 1, wherein the support comprises an outer wall which delimits the inner cavity and which has a thickness between 0.3 mm and 1 mm.
6. The manufacturing method according to claim 5, wherein the outer wall of the support has a thickness of 0.6 mm.
7. The manufacturing method according to claim 1, wherein the inner cavity is configured to stretch of 80% along a maximum deformation direction of the inner cavity.
8. The manufacturing method according to claim 1, wherein a linking portion is located between the support and the part blank,
    wherein the linking portion has a lower mechanical strength than the mechanical strength of the part blank and the mechanical strength of the support, wherein the linking portion is broken when separating the part blank from the support.
9. The manufacturing method according to claim 8, wherein the linking portion is broken by being torn when separating the part blank from the support.
10. The manufacturing method according to claim 8, wherein the linking portion has a lower density than the density of the part blank and/or the density of an outer wall of the support.
11. The manufacturing method according to claim 8, wherein the part blank, the support, the linking portion are made of a same metallic material.
12. The manufacturing method according to claim 8, comprising the separation of the linking portion from the part blank after the separation of the part blank from the support.
13. The manufacturing method according to claim 1, comprising additive manufacturing of the part blank and the support on the manufacturing plate, with a powder-bed selective melting or selective sintering method.
14. The manufacturing method according to claim 1, wherein the heating of the support takes place during a stress-relieving heat treatment of the part blank to limit the thermal and/or mechanical stress of the part blank.
15. The manufacturing method according to claim 1, comprising a step of separating the part blank from the manufacturing plate to which the part blank and the support are securely connected, after separating the part blank from the support.

* * * * *